United States Patent
Bullock et al.

(10) Patent No.: US 9,877,617 B2
(45) Date of Patent: Jan. 30, 2018

(54) CONTROL FOR PRODUCT DISPENSER ENERGY STORAGE DEVICE

(71) Applicant: GOJO Industries, Inc, Akron, OH (US)

(72) Inventors: Mark A Bullock, Wooster, OH (US); Bradley L. Lightner, North Canton, OH (US); Panagiotis Zosimadis, Toronto (CA)

(73) Assignee: GOJO INDUSTRIES, INC, Akron, OH (US)

( * ) Notice: Subject to any disclaimer, the term of this patent is extended or adjusted under 35 U.S.C. 154(b) by 4 days.

(21) Appl. No.: 14/682,664

(22) Filed: Apr. 9, 2015

(65) Prior Publication Data

US 2015/0320265 A1 Nov. 12, 2015

Related U.S. Application Data

(60) Provisional application No. 61/977,962, filed on Apr. 10, 2014.

(51) Int. Cl.
*A47K 5/12* (2006.01)
*H02J 7/00* (2006.01)
*H02J 7/34* (2006.01)

(52) U.S. Cl.
CPC .......... *A47K 5/1217* (2013.01); *A47K 5/1211* (2013.01); *H02J 7/0052* (2013.01); *H02J 7/345* (2013.01); *A47K 5/1207* (2013.01); *H02J 7/0063* (2013.01); *H02J 2007/0067* (2013.01)

(58) Field of Classification Search
CPC . A47K 5/1217; H02J 7/345; H02J 2007/0067
USPC .......................................................... 222/63
See application file for complete search history.

(56) References Cited

U.S. PATENT DOCUMENTS

| | | | | |
|---|---|---|---|---|
| 4,722,372 | A | 2/1988 | Hoffman | |
| 6,209,752 | B1* | 4/2001 | Mitchell | A47K 5/1215 222/181.3 |
| 2008/0185396 | A1 | 8/2008 | Yang | |
| 2008/0269724 | A1* | 10/2008 | Sarkinen | A61M 5/14276 604/891.1 |
| 2010/0320227 | A1* | 12/2010 | Reynolds | A47K 5/1217 222/52 |
| 2014/0021887 | A1* | 1/2014 | Keily | H02P 1/18 318/139 |

(Continued)

FOREIGN PATENT DOCUMENTS

WO 2014/130236 A1 8/2014

*Primary Examiner* — Fritz M Fleming
(74) *Attorney, Agent, or Firm* — Calfee, Halter, & Giswold LLP

(57) ABSTRACT

An energy storage device, like for example a supercapacitor, is used to provide power to activate a motor for dispensing a dosed amount of hand care product. The energy storage device or supercapacitor is recharged from an energy supply source, e.g. batteries, integrated into the replaceable refill reservoir and/or mounted into the dispenser housing. A controller directs energy discharged from the energy supply source(s) at one of a plurality of discharge energy rates for recharging the energy storage device. Depending on the number of dispense events that occur with a given time interval, the controller may vary the rate at which the energy is discharged from the energy supply source(s) to recharge the energy storage device.

22 Claims, 13 Drawing Sheets

(56) References Cited

U.S. PATENT DOCUMENTS

2014/0054322 A1   2/2014   McNulty

* cited by examiner

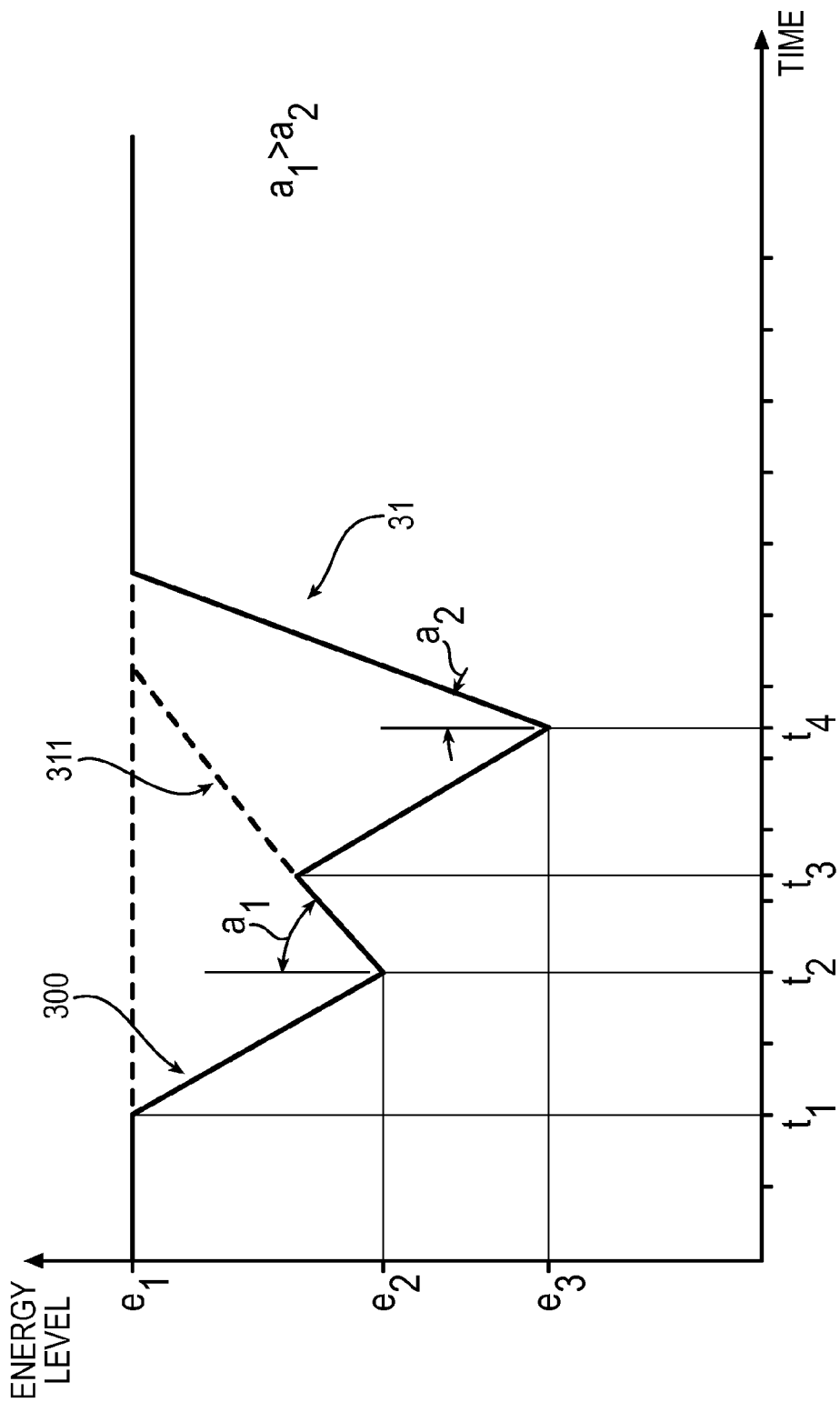

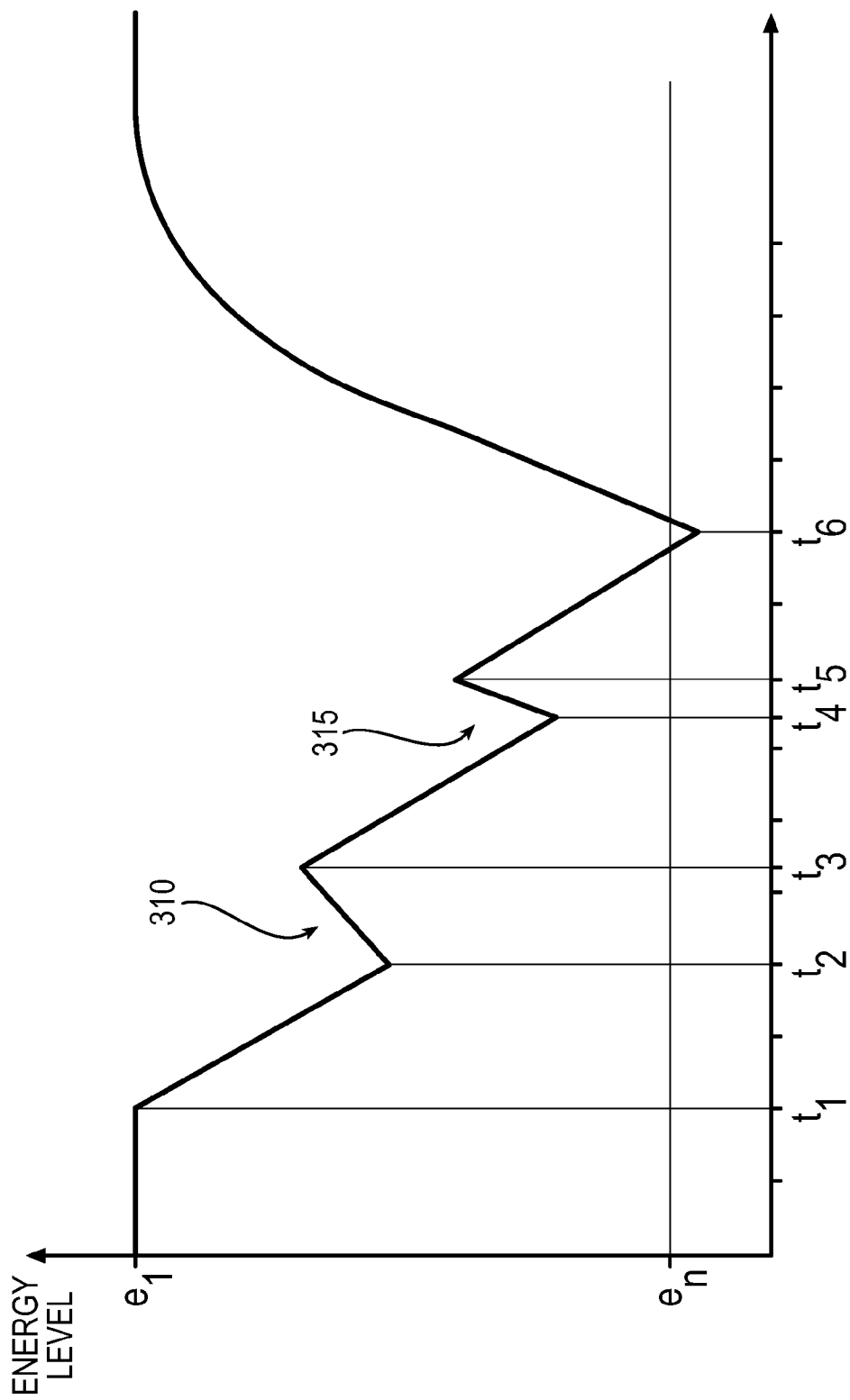

PROVIDING A PRODUCT DISPENSER HAVING A HOUSING, A READILY REPLACEABLE PRODUCT RESERVOIR FOR STORING PRODUCT, A PUMP HAVING AN INLET FLUIDLY CONNECTED TO THE PRODUCT RESERVOIR, THE PUMP HAVING OUTLET FOR DISPENSING PRODUCT, A LOW-VOLTAGE MOTOR OPERATIVELY COUPLED TO ACTUATE THE PUMP, AN INTERMEDIATE ENERGY STORAGE DEVICE OPERATIVELY COMMUNICATED TO PROVIDE OPERATING POWER TO THE MOTOR, WHEREIN THE INTERMEDIATE ENERGY STORAGE DEVICE IS CONFIGURED TO STORE A SUFFICIENT AMOUNT OF ENERGY TO ACTIVATE THE MOTOR MULTIPLE TIMES, A LOW POWER-DENSITY BATTERY FOR RECHARGING THE INTERMEDIATE ENERGY STORAGE DEVICE WHEREIN THE LOW POWER-DENSITY BATTERY IS INTEGRATED INTO THE READILY REPLACEABLE PRODUCT RESERVOIR, A CONTROLLER HAVING A CHARGING CIRCUIT OPERATIVELY CONNECTED TO THE LOW POWER-DENSITY BATTERY AND THE INTERMEDIATE ENERGY STORAGE DEVICE, WHEREIN THE CONTROLLER INCLUDES AN ACTIVATION CIRCUIT OPERATIVELY CONNECTED TO ACTIVATE THE MOTOR, AND WHEREIN THE CONTROLLER INCLUDES A COUNTER CIRCUIT CONFIGURED TO COUNT THE NUMBER OF TIMES THE ACTIVATION CIRCUIT ACTIVATES THE MOTOR

INCREMENTING THE COUNTER CIRCUIT IN RESPONSE TO ACTIVATING THE MOTOR

RECHARGING THE INTERMEDIATE ENERGY STORAGE DEVICE AT A FIRST RECHARGE RATE IN RESPONSE TO ACTIVATING THE MOTOR WHEN THE COUNT IN THE COUNTER CIRCUIT IS BELOW PREDETERMINE COUNTER VALUE

RECHARGING THE INTERMEDIATE ENERGY STORAGE DEVICE AT A SUBSTANTIALLY DIFFERENT SECOND RECHARGE RATE IN RESPONSE TO ACTIVATING THE MOTOR WHEN THE COUNT IN THE COUNTER CIRCUIT HAS EXCEEDED THE PREDETERMINE COUNTER VALUE

FIG. 11

CONTROL FOR PRODUCT DISPENSER ENERGY STORAGE DEVICE

RELATED APPLICATIONS

This patent application claims priority to patent application Ser. No. 61/977,962, titled DISCHARGE RATE CONTROL FOR PRODUCT DISPENSER ENERGY STORAGE DEVICE, filed on Apr. 10, 2014, which is incorporated herein by reference in its entirety.

FIELD OF THE INVENTION

The current invention relates generally to fluid product dispensers and in particular to refill reservoirs used in touch-free dispensers. More specifically, the current invention relates to refill reservoirs that include a source of energy that powers the fluid dispenser and methods of discharging that energy.

BACKGROUND OF THE INVENTION

It is commonplace for publicly accessible facilities to provide soap dispensers in washrooms and other areas. Some systems are designed to receive disposable refill units produced in a sanitary environment. When empty of product, the whole reservoir is replaced along with the accompanying nozzle and pump. In this way, every part wetted by soap is disposed of when the dispenser is serviced. This greatly reduces and/or eliminates the germination of biofilms and contributes to the cleanliness of the facility.

In many instances, soap dispensers are automated to provide hands-free operation. These types of dispensers eliminate direct contact by the user, thereby reducing the possibility of germ transmission. Sensors are typically installed at a location near the nozzle where fluid product is discharged. When a user positions his or her hands near the sensor, the fluid dispenser automatically dispenses a measured amount of fluid product. A motor drives the pump which is fluidly connected to the reservoir. Naturally, power is needed to drive the motor which in some instances is supplied by a direct connection to the facilities main power. However, it is significantly easier to install a dispenser that has a self-contained source of energy.

For dispensers using an onboard power supply, electrical energy is often supplied in the form of batteries installed into the dispenser housing. However, one problem with dispensers of this type relates to the maintenance and replacement of the batteries. It is difficult or impossible to tell how much power is remaining in the batteries of a dispenser, or how spurts in usage will drain the remaining power in the batteries. To prevent dispenser downtime, service personnel must repeatedly check the batteries or replace the batteries before they are fully discharged, neither of which is cost-effective.

To alleviate this problem, it is possible to incorporate additional batteries into the refill unit. In this way a fresh supply of batteries is provided every time the dispenser reservoir is replaced. Moreover, the size and power output capacity of batteries in the dispenser can be scaled down and sized to accommodate the duty cycle of a single dispenser refill. The refill unit batteries can be provided in the form of "coin cells", also known as watch batteries, which are small and relatively inexpensive. However, coin cells are incapable of rapidly discharging energy. If power is drawn too quickly from a coin cell, the useful life of the battery can be greatly reduced.

To maximize the useful life of a coin cell battery, some dispensers incorporate an energy storage device, like for example a capacitor, to provide power to the dispenser motor. The capacitor is capable of supplying quick bursts of energy to the motor. After one or more dispensing cycles, the capacitor may be slowly recharged by the coin cell. However, capacitors have limited storage capacity and drain quickly with repeated use. In busy environments, the capacitor may be incapable in keeping up with dispensing activity. Accordingly, the controller must then draw power from the onboard batteries. In environments with less traffic, energy stored in the capacitors may dissipate over time. Even though the capacitor may be recharged from the onboard batteries, energy is being used but fluid product is not being dispensed. In this instance, the batteries may be depleted long before the reservoir is empty of product.

What is needed is a way of dynamically drawing energy from the onboard power supply that corresponds to the frequency of usage of the fluid product dispenser. The embodiments of the subject invention obviate the aforementioned problems.

SUMMARY OF THE INVENTION

In one embodiment of the subject invention, a dispensing system includes a housing designed to support a replaceable refill reservoir. The reservoir can include a pump and dispensing nozzle, which are assembled as a complete unit. A motor installed in the dispensing system actuates the reservoir pump. One or more batteries, incorporated into the refill reservoir, supply power to drive the motor. A capacitor is included with control circuitry that draws power from the batteries at a controlled rate. The rate by which the controller draws power from the batteries changes based on how rapidly the dispensing system is activated.

In another embodiment of the subject invention, the rate at which the controller draws power from the batteries changes based on how much fluid product is remaining in the refill reservoir.

In yet another embodiment of the subject invention, at least a first battery is incorporated into the refill reservoir and at least a second battery is incorporated into the housing of the dispensing system.

In one embodiment, a product dispenser includes a dispenser housing, a readily replaceable product reservoir for storing product which may be a hand care product, a battery integrated into the readily replaceable product reservoir, a pump having an inlet fluidly connected to the readily replaceable product reservoir where the pump includes an outlet for dispensing the product, an electrically powered, low-voltage motor coupled to actuate the pump, an intermediate energy storage device or supercapacitor electrically communicated to provide operating power to the motor where the intermediate energy storage device is configured to store a predetermined level of energy or a predetermined upper threshold level of energy that is sufficient to activate the motor through multiple activation cycles, and a controller communicated to activate the motor in response to a dispense event initiated by a user where the controller is communicated to the battery and to the intermediate energy storage device, and wherein the controller initiates discharging energy from the battery in response to the motor being activated for recharging the intermediate energy storage device to the predetermined level of energy, and wherein the controller is operable to selectively initiate discharging energy from the battery at one of a plurality of substantially different discharge rates, and wherein when the motor is activated the controller changes the discharge rate of discharging energy from the battery if the intermediate energy storage device has not been substantially recharged to the predetermined level of energy.

In one aspect of the subject invention, in response to activating the motor the controller initiates discharging energy from the battery at a first discharge rate to recharge the intermediate energy storage device within a first time interval, and in response to activating the motor again within the first time interval the controller increases the first discharge rate to a greater second discharge rate.

In another aspect of the subject invention, an energy source is mounted to the dispenser housing and is selectively communicated to the intermediate energy storage device, and the controller is operable to selectively initiate discharging energy from one or both of the batteries integrated into the readily replaceable product reservoir and the energy source operatively mounted to the dispenser housing for recharging the intermediate energy storage device.

In yet another aspect of the subject invention, when the energy level in the intermediate energy storage device falls below a lower threshold energy level or a critically low energy level, the controller initiates discharging energy from the energy source operatively mounted to the dispenser housing to recharge the intermediate energy storage device.

In still another aspect of the subject invention, when the energy level in the intermediate energy storage device falls below the lower threshold energy level or the critically low energy level, the controller deactivates the flow of energy from the battery integrated into the readily replaceable product reservoir.

In even another aspect of the subject invention, when the energy level in the intermediate energy storage device falls below the lower threshold energy level or the critically low energy level, the controller initiates the flow of energy from the battery integrated into the readily replaceable product reservoir and from the energy source operatively mounted to the dispenser housing to recharge the intermediate energy storage device.

In another embodiment of the subject invention, a method of operating a product dispenser includes the steps of: providing a product dispenser having a dispenser housing, a product reservoir for storing an associated product, a pump having an inlet fluidly connected to the product reservoir, the pump having an outlet for dispensing the associated product, a motor operatively coupled to actuate the pump, an intermediate energy storage device operatively communicated to provide operating power to the motor, a low power-density battery for recharging the intermediate energy storage device, a controller having a charging circuit operatively connected to the low power-density battery and the intermediate energy storage device for recharging the intermediate energy storage device, wherein the controller includes an activation circuit operatively connected to activate the motor, wherein the motor is operated in a finite activation cycle; activating the motor to dispense a predetermined amount of the associated product; discharging energy from the low power-density battery at a discharge rate to recharge the intermediate energy storage device within a first time interval; re-activating the motor within the first time interval; and increasing the discharge rate of energy being discharged from the battery to recharge the intermediate energy storage device in response to re-activating the motor within the first time interval.

In one aspect of the embodiments of the subject invention, a method of operating a product dispenser includes providing a product dispenser having a sensor configured to detect the motion of an associated user, wherein the sensor has an output operatively connected to the activation circuit of the controller; and automatically activating the motor to dispense a predetermined amount of associated product in response to detecting the motion of an associated user.

In another aspect of the embodiment of the subject invention, a method of operating a product dispenser includes providing a controller having a monitoring circuit communicated to the intermediate energy storage device for monitoring the level of energy stored in the intermediate energy storage device; and monitoring the level of energy stored in the intermediate energy storage device.

In yet another aspect of the embodiments of the subject invention, a method of operating a product dispenser includes defining a critically low threshold energy level of energy stored in the intermediate energy storage device, providing a product dispenser having an alternate energy source operatively mounted to the dispenser housing, and providing a controller that selectively recharges the intermediate energy storage device from one or both of the low power-density batteries and the alternate energy source in response to the level of energy in the intermediate energy storage device falling below the critically low threshold energy level.

In still another aspect of the subject invention, a method of operating a product dispenser includes progressively increasing the rate of energy being discharged from the low power-density battery in response to repeatedly re-activating the motor within the first time interval.

In another embodiment of the subject invention, a method of operating a product dispenser includes the steps of: providing a product dispenser having a dispenser housing, a readily replaceable product reservoir for storing associated product, a pump having an inlet fluidly connected to the product reservoir, the pump having outlet for dispensing associated product, a low-voltage motor operatively coupled to actuate the pump, an intermediate energy storage device operatively communicated to provide operating power to the motor, wherein the intermediate energy storage device is configured to store a sufficient amount of energy to activate the motor multiple times, a low power-density battery for recharging the intermediate energy storage device wherein the low power-density battery is integrated into the readily replaceable product reservoir, a controller having a charging circuit operatively connected to the low power-density battery and the intermediate energy storage device, wherein the controller includes an activation circuit operatively connected to activate the motor, and wherein the controller includes a counter circuit configured to count the number of times the activation circuit activates the motor; incrementing the counter circuit in response to activating the motor; recharging the intermediate energy storage device at a first recharge rate in response to activating the motor when the count in the counter circuit is below a predetermine counter value; and recharging the intermediate energy storage device at a substantially different second recharge rate in response to activating the motor when the count in the counter circuit has exceeded the predetermine counter value.

In one aspect of the embodiments of the subject invention, the method of operating a product dispenser includes recharging the intermediate energy storage device at a greater second recharge rate in response to activating the motor when the count in the counter circuit has exceeded the predetermine counter value.

In another aspect of the embodiments of the subject invention, the method of operating a product dispenser includes: providing a controller having a timer circuit; and recharging the intermediate energy storage device within a predetermined time interval and at a substantially different second recharge rate in response to activating the motor when the count in the counter circuit has exceeded the predetermine counter value.

In yet another aspect of the embodiments of the subject invention, the method of operating a product dispenser includes engaging the controller to substantially empty the low power-density battery of energy when the counter has exceeded a second predetermine counter value of the number of times the activation circuit activates the motor.

In still another aspect of the embodiments of the subject invention, the method of operating a product dispenser includes resetting the count in the counter circuit when the readily replaceable product reservoir has been replaced.

BRIEF DESCRIPTION OF THE DRAWINGS

FIG. 7a is a graph depicting changes to the level of energy stored in the intermediate energy storage device over time, according to the embodiments of the subject invention.

FIG. 8 is a graph depicting changes to the level of energy stored in the intermediate energy storage device over time, according to the embodiments of the subject invention.

FIG. 11 is flow diagram of another method of the subject invention, according to the embodiments of the subject invention.

DETAILED DESCRIPTION

Figure 1:
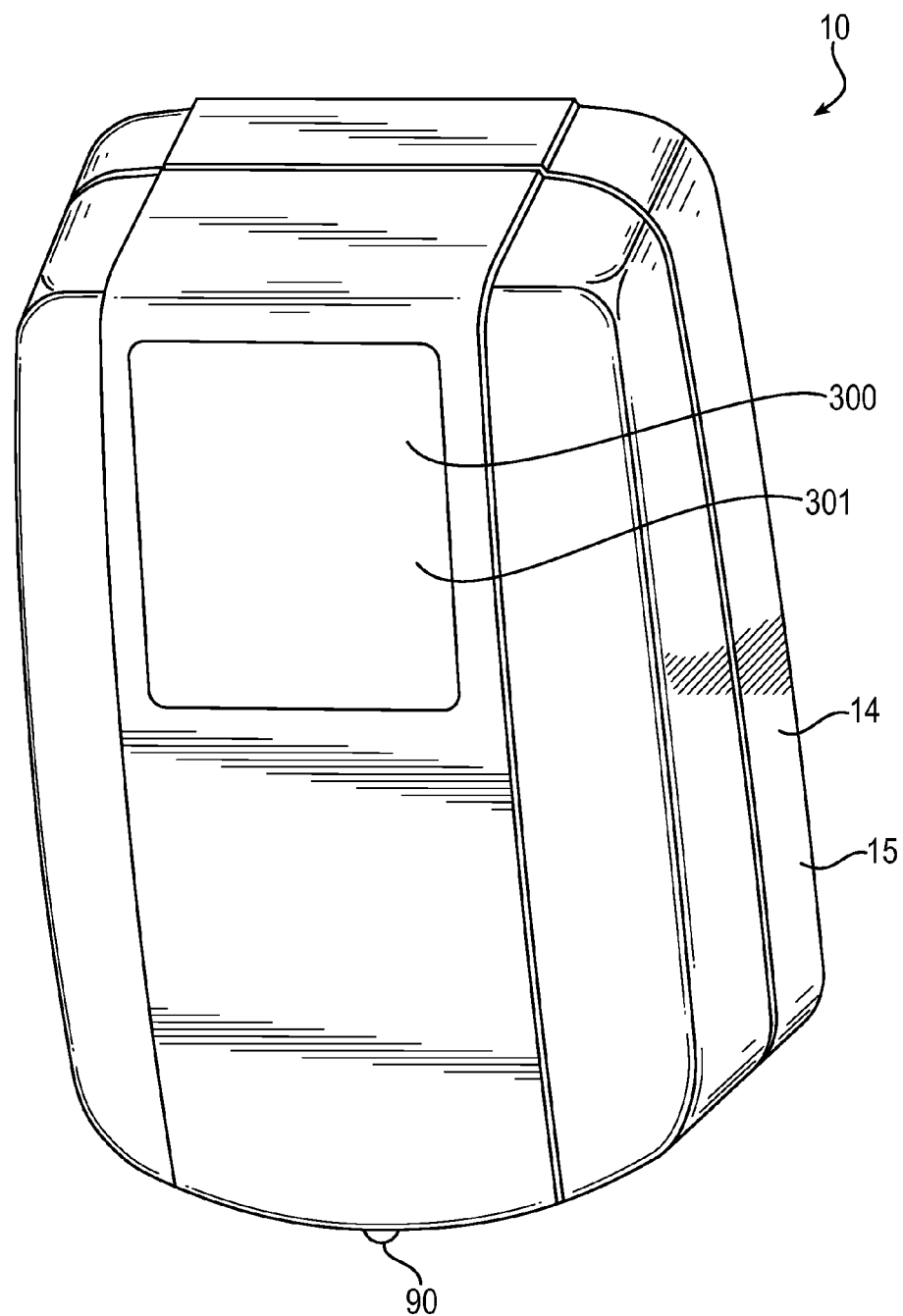
FIG. 1 depicts a perspective view of the product dispensing system, according to the embodiments of the subject invention.

A product dispensing system, depicted in FIG. 1, dispenses a measured amount of fluid product according to the embodiments of the subject invention. In one exemplary instance, the dispensing system, shown generally at 10, dispenses hand care products like soap, lotion or hand sanitizer, although other types of products may be similarly dispensed from the dispensing system.

Figure 1A:
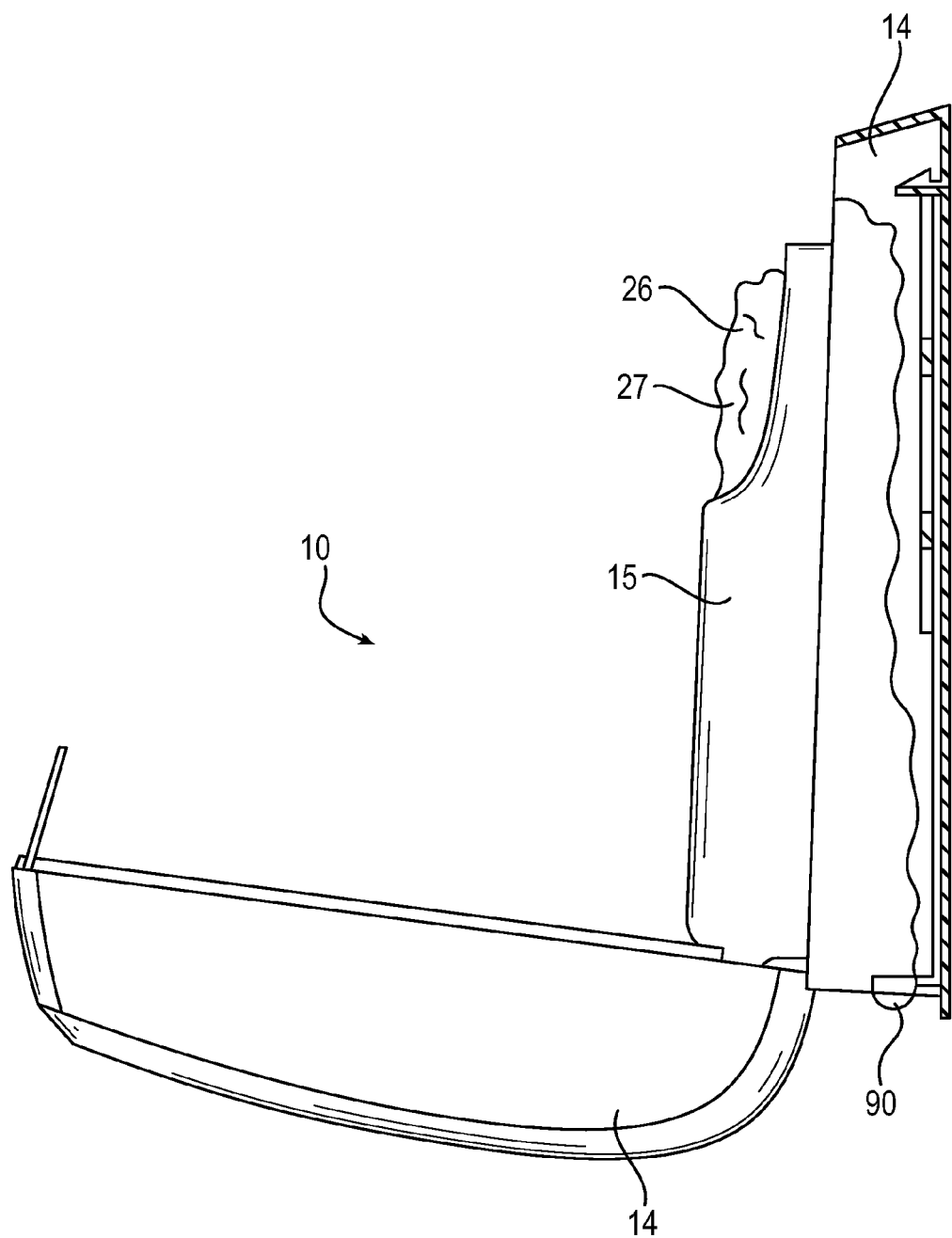
FIG. 1a depicts a partial cut-away side view of the product dispensing system, according to the embodiments of the subject invention.

In the embodiment depicted in FIGS. 1 and 1a, the dispensing system 10, also referred to as fluid dispenser 10, includes a dispenser housing 14 or base. The dispenser housing 14 is made of one or more walls 15 constructed to support the components of the fluid dispenser 10. Plastic may be used for cost effective manufacturing of the dispenser housing 14, as well as other components of the system. A fluid reservoir 26 supplies fluid product to the fluid dispenser 10 and is mounted to the dispenser housing 14 in an inverted manner. The walls 15 of the dispenser housing 14 may form a concave, open top section that receives the fluid reservoir 26. In one particular embodiment, the fluid reservoir 26, also referred to as product reservoir 26, may be readily replaceable. As such, the fluid reservoir 26 or product reservoir 26 comprises a replaceable product reservoir 26.

A posterior side (not shown) of the fluid dispenser 10 may include apertures and/or slots for mounting the fluid dispenser 10 to a secure structure. In one embodiment, the dispenser housing 14 may be directly mounted to a wall or a dispenser stand (also not shown) via fasteners. In other embodiments, a mounting bracket is provided and includes mounting holes that receive fasteners for securing the mounting bracket to the wall or other structure. In this embodiment, the dispenser housing 14 may be removably attached to the mounting bracket. In that the mounting of fluid dispensers to supporting structures is known in the art, no further explanation will be provided.

Figure 2:
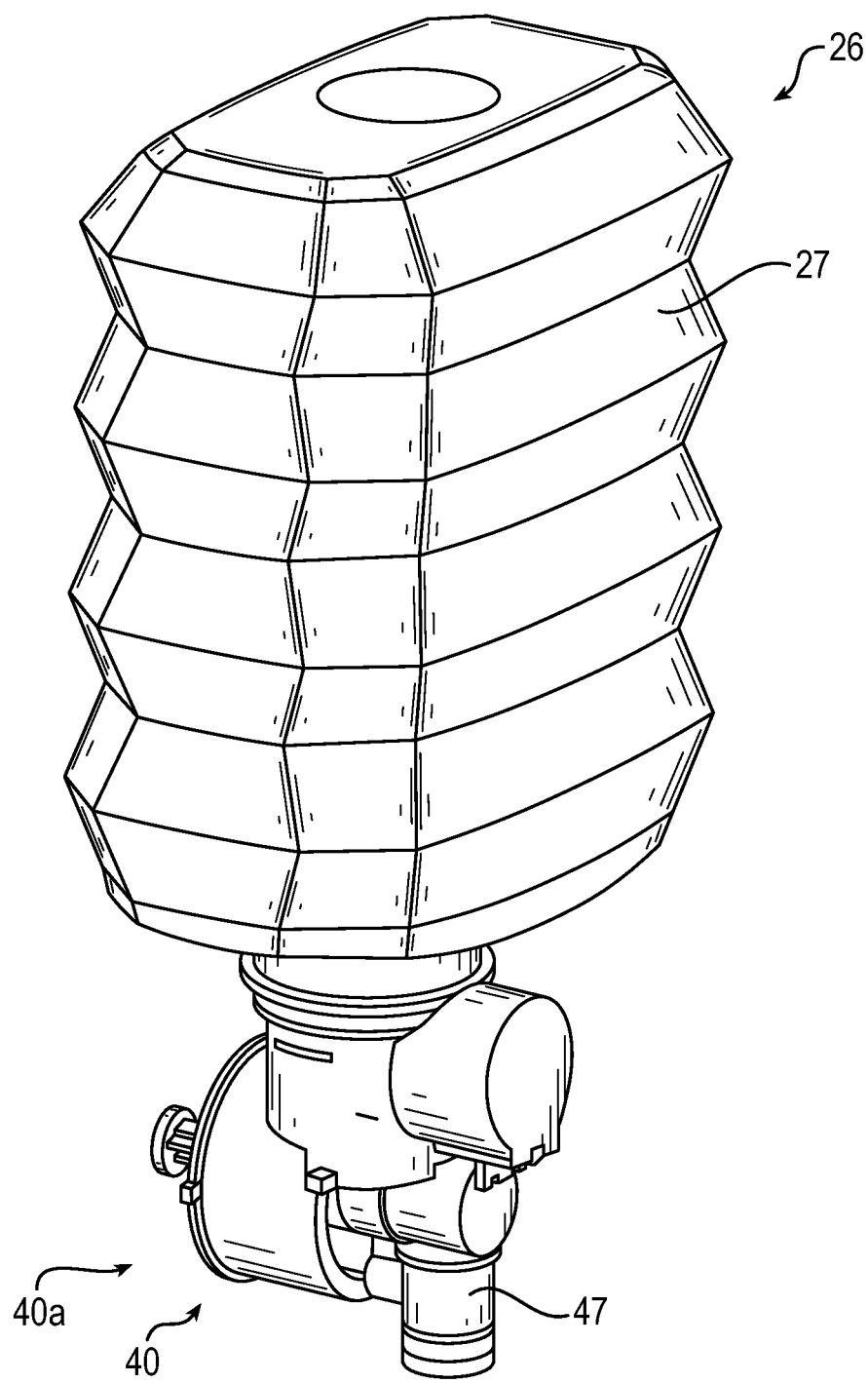
FIG. 2 is a perspective view of a product reservoir for use with the dispensing system, according to the embodiments of the subject invention.

Referring now to FIGS. 1, 1a and 2, product reservoir 26 is constructed to hold a dispensable product, which may be a hand care product. The walls 27 of the product reservoir 26 may be constructed of sheet-like material forming a container having an opening at one end configured for attachment to a pump in a fluid-tight (or air-tight) manner. Any type of material, shape and dimensions of the walls 27 and/or opening may be chosen as is appropriate for the storing of product therein. Blow molding, or other plastic molding process, may be used to form the fluid reservoir 26.

As mentioned above, the product reservoir 26 is constructed as a readily replaceable container. By replaceable it is meant that the container is intended to be discarded when emptied of product and substituted with a sealed refill replacement. In addition to the product reservoir 26, the pump and nozzle, may also be discarded when the product reservoir 26 is exhausted. Thus, a new assembly of reservoir, pump and nozzle can be supplied every time the fluid dispenser 10 is refilled.

Figure 3:
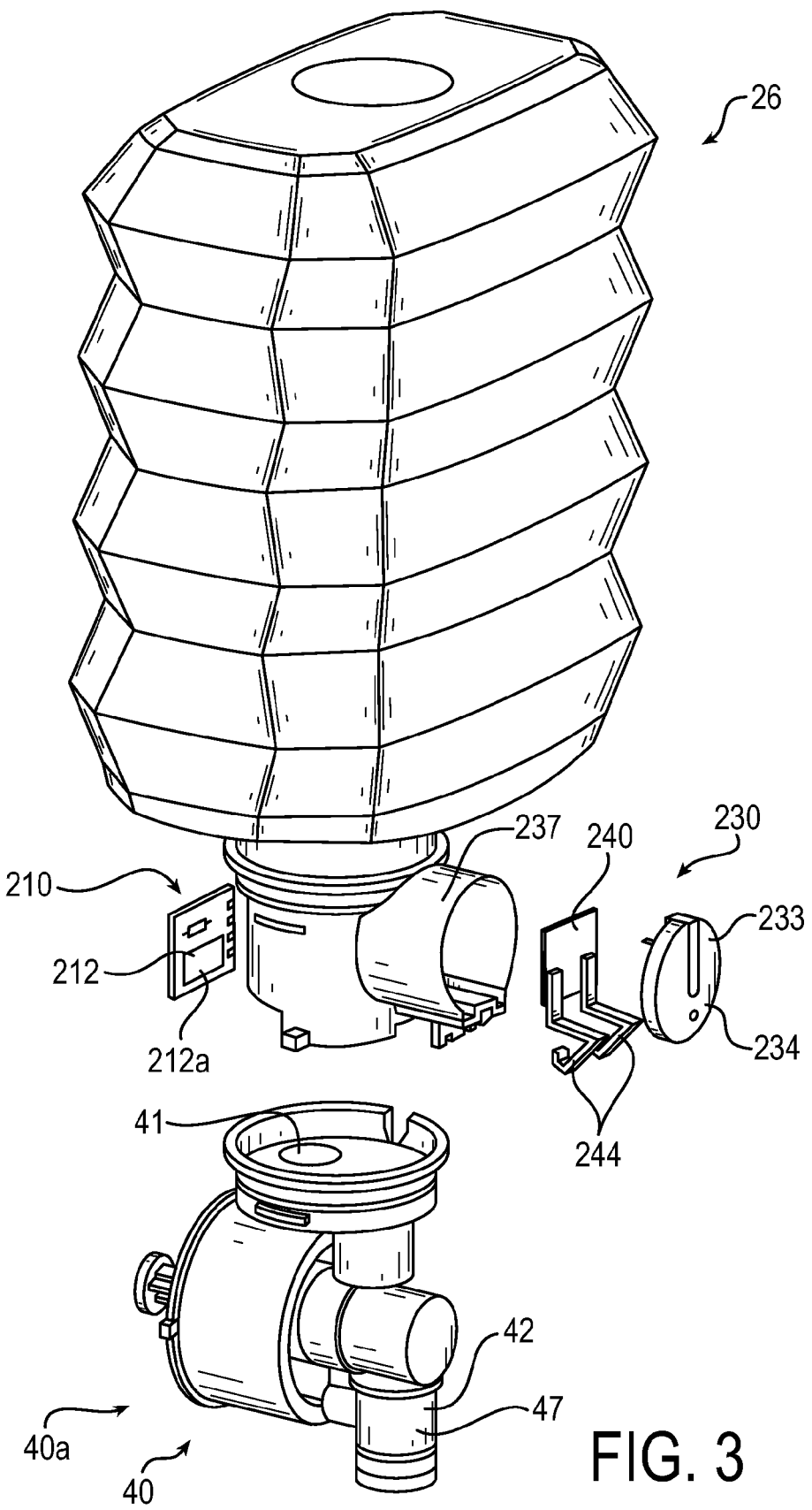
FIG. 3 is a exploded view of a product reservoir, according to the embodiments of the subject invention.

Still referencing FIG. 2 and now also FIG. 3, an exemplary embodiment of a dispenser pump 40 is shown. The pump 40 includes a pump inlet 41 and a pump outlet 42. The pump outlet is fixedly connected to a nozzle 47 for dispensing fluid product from the fluid dispenser 10. The pump inlet is connected to the fluid reservoir 26. Specifically, the pump inlet is fixedly attached and sealed to the opening of the fluid reservoir 26 in a fluid-tight or air-tight manner. Accordingly, the pump 40, nozzle 47 and fluid reservoir 26 are provided as an assembly. In this manner, every wetted component of the fluid dispenser 10 is disposed of when the fluid reservoir 26 is replaced.

The pump 40 induces pressure in the system, either positively or negatively (vacuum pressure) to convey fluid from the reservoir 26 to the nozzle 47. In one particular embodiment, the pump 40 may be a piston pump 40a, although other types of pumping mechanisms including but not limited to gear pumps or reciprocating pumps may be employed. The pump 40 may further incorporate one or more valves, which may be check valves, for ensuring that fluid flows from the pumping chamber and out through the nozzle, i.e. not back into the reservoir.

The pump 40 may be driven by a motor 48. The motor 48 may be either a DC or an AC motor. However, in one preferred embodiment, the motor is a low-voltage, DC motor 48 that draws power from an onboard power supply which may comprise one or more batteries to be discussed in detail below. The motor may be connected to a mechanical transmission, not shown in the figures. The transmission may convert rotational motion, as provided by the output shaft of the motor, into linear motion for use in reciprocating the piston of pump 40. In one particular embodiment, the transmission may comprise a cam actuator. Together the motor, transmission and pump are configured to dispense a predetermined quantity of fluid product for each operating cycle. Notably, the motor 48 may be directly connected to the pump without incorporating a transmission.

With continued reference to FIG. 3, a validation key or tag may be implemented between the product reservoir 26 and dispensing system 10 for validating the contents of the product reservoir 26. In one particular embodiment, product reservoir 26 includes an electronic key, not shown. The electronic key may employ one or more types of systems using near-field communications. More specifically, the key may comprise an RFID (Radio Frequency Identification) tag, which may be either passive or active. A corresponding interrogator, not shown, may be mounted to the dispenser housing 14. When the product reservoir 26 is installed into the dispenser 10, the interrogator will automatically "ping" the electronic key to verify that the correct product reservoir is being used. If an incorrect product reservoir has been installed, the dispensing system controller 170 functions to prevent operation of the dispenser. Depending on the range, i.e. strength, of the RFID signals, it is contemplated that the interrogator may be mounted onto a circuit board located in the system controller 170 or elsewhere in the dispensing system 10. Alternative embodiments are considered where a near field magnetic induction system, not shown, is used as an electronic tag. In this type of tagging system, specially tuned coiled inductors are used to ensure that the appropriate product reservoir 26 is being used with the correct dispenser. The system uses at least one emitter coil disposed within the dispenser and electrically communicated with the dispenser controller 170. The emitter coil is connected with one or more electrical components, which may include in an exemplary manner capacitors. Those skilled in the art will recognize that different values of capacitance along with placement of the capacitors in the circuit provide nearly endless combinations of electronic keying. Accordingly, a receiver coil, also not shown, may be installed with the product reservoir 26. It follows that the receiver coil is similarly tuned with the emitter coil. In this way, the controller may determine whether or not the proper product reservoir 26 has been installed in the dispenser 10.

In another embodiment, a validation key may be employed where the product reservoir 26 is directly connected with the controller 170. By directly connected it is meant that one or more sets of conductors are physically brought into contact for the purpose of transmitting electrical signals between the components of the product reservoir 26 and one or more components of the dispensing system 10. The validation key may comprise any form of electronic keying chosen with sound judgment to those skilled in the art. Similar to that described above, the electronic key may be either passive or active. In one particular embodiment, conductors, which may be conductors 244, are included that run from the validation key to contact terminals, not shown, disposed on an exterior portion of the product reservoir 26. The exposed terminals may be electrically communicated with conductors 244 or may be configured to directly contact matching terminals in the dispensing system 10. As such, when the product reservoir 26 is installed into the dispensing system 10, the sets of contact terminals are brought into electrical contact with each other thereby directly electrically communicating the key with the controller 170. It is noted that other forms of electrical communication may be transmitted via the direct connection of the terminals including but not limited to the exchange of other types of data with the controller 170 and/or the transmission of power between the product reservoir 26 and the onboard power supply. Still, skilled artisans will appreciate that other forms of tagging may be used, examples of which may include keyed mechanical fittings or optical sensor systems. Any manner of ensuring that the dispensing system 10 works only with the proper product reservoir 26 may be chosen as is consistent with the subject invention described herein.

In one particular embodiment, sensors 90 may be incorporated into the dispensing system 10. These sensors are used to detect motion for hands-free activation of the dispensing system 10. The sensors 90 may comprise one or more IR emitters and detectors. The emitter-detector pair(s) may be oriented in a manner that ensures consistent activation of the dispensing system 10 in a particular region under the nozzle 16. Still, other types of sensing components may be used to facilitate hands-free activation of the dispensing system without departing from the intended scope of coverage of the embodiments of the subject invention.

Figure 4:
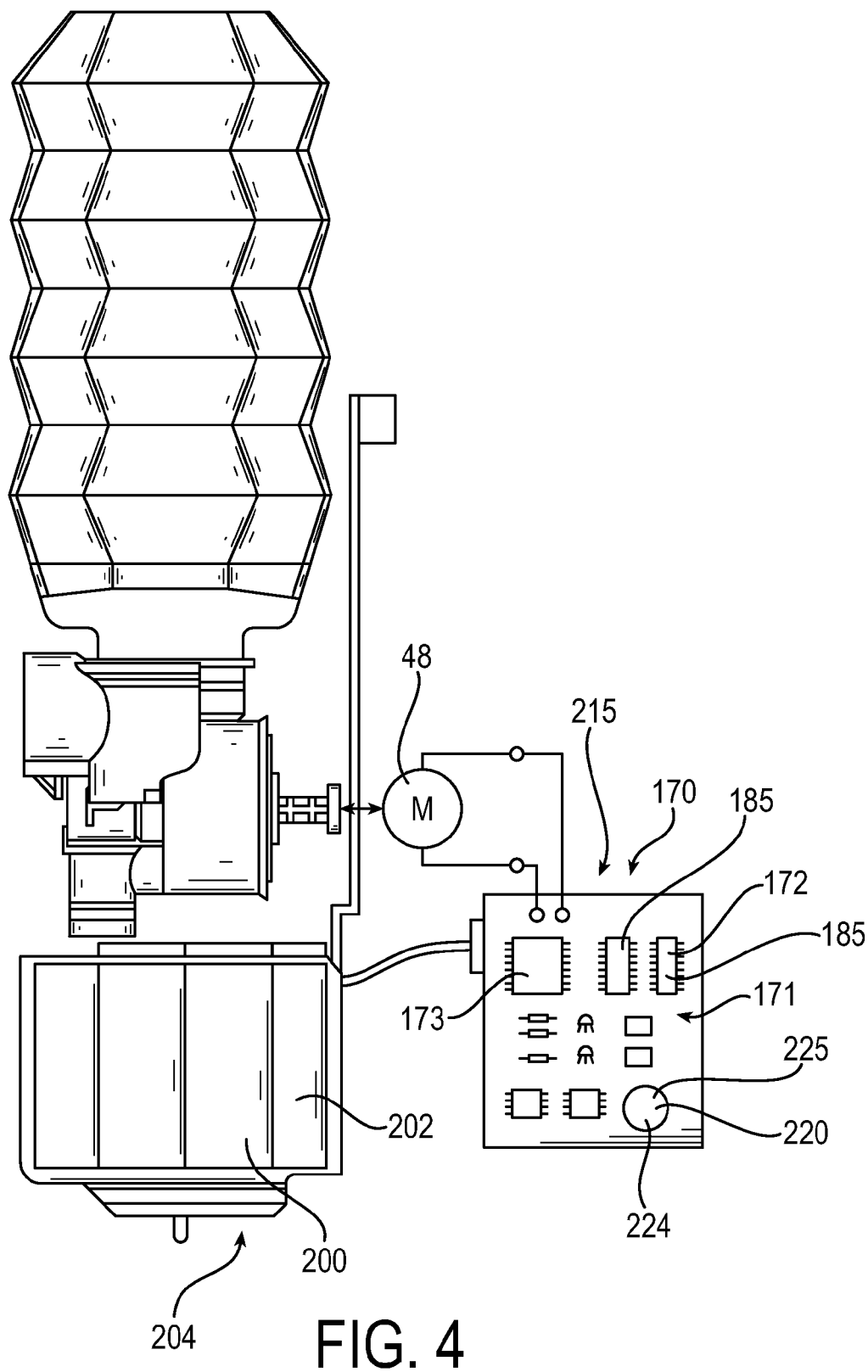
FIG. 4 is a side view of a product reservoir, controller and energy storage device for a dispensing system, according to the embodiments of the subject invention.

With reference now to FIG. 4, the dispensing system 10 includes a controller or control system 170 comprising one or more electronic circuits 171 for controlling the various functions of the dispensing system 10. The electronic circuitry 171 may reside on a printed circuit board and received in a suitable enclosure within the dispenser housing 14.

The electronic circuitry 171 may comprise digital electronic circuitry 172 designed to receive and process data relating to operation of the dispensing system 10. In particular, the digital electronic circuitry 172 may function to receive input signals from the electronic validation key 40, onboard sensors 90, as well as other components in the dispensing system 10. Such circuitry may communicate with analog-to-digital converters that convert output signals from components of the keying device and/or sensors 90. Other sensors may be incorporated that measure the amount of product remaining in the reservoir 26.

In one embodiment, the digital electronic circuitry 172 may comprise one or more logic processors 173, which may be selectively programmable. Logic processor 173 may be operable to execute instructions as coded in an algorithm. In this way, a coded sequence of instructions implemented by the logic processors, as well as hard wired circuitry, may be used to control operation of the dispensing system 10. It will be appreciated that the digital electronic circuitry 172 may further include electronic data storage 185 or memory 185, which may comprise: memory registers internal to the logic processor, volatile memory such as D-RAM or SD-RAM and/or forms of non-volatile memory. Moreover, the digital electronic circuitry 172 may include one or more timer circuits 175 (reference FIG. 5). The timer circuits may be used in determining how fast or frequent the dispensing system 10 is being used. In one embodiment, the timer circuit(s) 175 are used to measure how many times the motor 48 has been activated within a given time period or whether onboard energy storage devices have been recharged within a particular time interval, both of which may be used to adjust the discharge rate of the batteries, as will be discussed further below.

The digital electronic circuitry 172 also functions to output signals used to control operation of the dispensing system 10, like for example operation of the electric motor 48. The output signals may comprise low voltage DC signals. The outputs signals may engage one or more amplifiers and/or relays that directly control actuation of the motor 48, although other means of controlling the motor 48 may be chosen with sound judgment. It is noted here that directly controlling activation of the motor 48 may encompass the selective connection of an electrical power source, like for example an intermediate energy storage device, to the motor 48. In whatever configuration, persons of skill in the art will understand the use and implementation of a wide array of circuitry as may be necessary for controlling operation of the motor 48 of the dispensing system 10.

Figure 5:
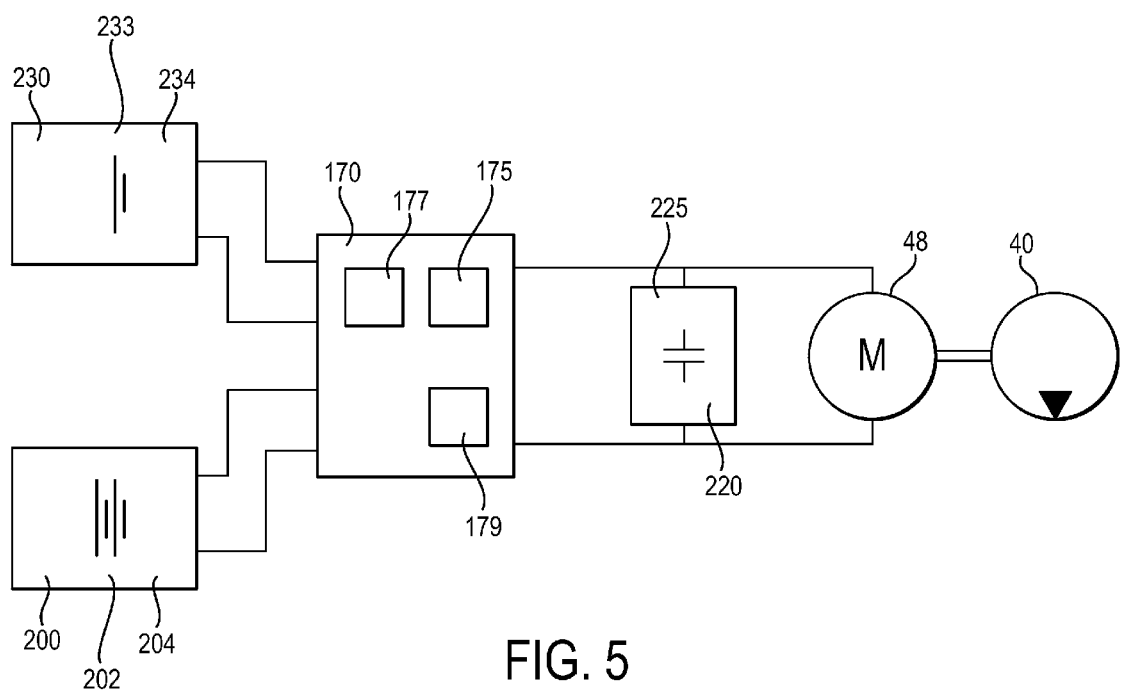
FIG. 5 is a schematic representation of the product dispensing system, according to the embodiments of the subject invention.

With reference to FIGS. 4 and 5, power to activate the motor 48 may be supplied from multiple sources of power. In one embodiment, the dispensing system 10 may incorporate a first onboard energy supply device 200. The first energy supply device 200 may comprise an electrochemical cell that converts chemical energy into electrical energy. One such example includes Alkaline batteries 202, which come in various output capacities including standard AA, C or D cell batteries. Other types of batteries 202 may be used without limiting the scope of the claimed invention. The energy supply device 200 may comprise a bank of batteries 204 received within the dispenser housing 14. It is contemplated in one particular embodiment that the bank of batteries 204 is permanently installed into the dispensing system 10. By permanently installed it is meant that the bank of batteries 204 is housed within the structural framework of the dispenser and is not readily accessible. While it is contemplated in other embodiments that the bank of batteries 204 may be replaced, in general the batteries of the first energy supply device 200 are not readily replaceable. It is noted here that the size and quantity of batteries 202 may be selected as is suitable for use with a particular type of dispensing system 10 and should not be construed as limiting. It is contemplated in one or more alternative embodiments that the power to actuate the motor may be substituted by or supplemented by other sources of energy examples of which may include, but are not limited to, photovoltaic cells.

With reference to FIGS. 3 and 5, a second onboard energy supply device 230 may be integrated into the product reservoir 26, also referred to as a refill container 26. In a manner similar to that of the first energy supply device 200, second energy supply device 230 may also be selectively, operatively connected to supply energy for activating the motor 48 as enabled by the controller 170. The second energy supply device 230 may comprise one or more batteries 233 incorporated into the structure 237, e.g. frame or housing, of the product reservoir 26. In one particular embodiment, battery 233 may comprise a low power-density battery 233. In one particular embodiment, the low power-density battery 233 may comprise a button cell battery or coin cell battery 234. As is known in the art, coin cells are known for having low discharge rates, as well as for having a small size and light weight. Notably, while coin cell 234 may be chosen because of its footprint, other types of batteries may be incorporated into the product reservoir 26 without departing from the intended scope of coverage of the subject invention. For example, AA or AAA cell alkaline batteries may be integrated into product reservoir 26. It will be readily seen that a fresh supply of energy from the second onboard energy supply device 230 is provided every time the product reservoir 26 is replaced.

The housing of the product reservoir 26 may be fashioned having one or more cavities configured to receive or enclose the second energy supply device 230. A conductor plate 240 may include electrically conductive leads 244 that connect to respective ends of the second energy supply device 230. In the embodiment incorporating coin cells, i.e. coin cell batteries 234, conductive leads 244 connect to the positive and negative terminals of the battery. The conductor plate 240 may also include conductors that direct the flow of current from the coin cell 234 to the controller 170, the motor 48 or intermediate energy storage device. In this manner, the second energy supply device 230 or batteries 234 are integrated into the product reservoir 26, i.e. replaceable product reservoir 26. It is noted here that the conductive leads 244 may be used to concurrently transmit data along with power, as discussed above. The data may relate to keying information, remaining level of product remaining in the reservoir 26, or any other type of information to be communicated between the product reservoir 26 and the controller 170.

As indicated above, the controller 170 is operable to direct power from either or both of the first and second energy supply devices 200, 230 for use in activating the motor 48. It will be understood that the first and second energy supply devices 200, 230 may discharge energy at one of a plurality of substantially different discharge rates as facilitated by the controller 170. In one particular embodiment, power to activate the motor 48 may be delivered to and temporarily stored in an intermediate energy storage device 220 which is electrically positioned between the first and second energy supply devices 200, 230 and the motor 48. The intermediate energy storage device 220 is capable of accumulating energy from the first and second energy supply devices 200, 230 and may be selectively connected to deliver operating power to the motor 48 as controlled by the controller 170. The intermediate energy storage device 220 may be capable of storing a charge of energy sufficient to activate the motor 48 over multiple activation cycles. In one instance, the intermediate energy storage device 220 is capable of activating the motor 5 to 15 times in a single charge, although the intermediate energy storage device 220 may have a greater or lesser energy storage capacity.

It is noted here that the motor 48 is characterized as having a finite activation cycle. By finite activation cycle it is meant that the motor 48 does not run continuously or indefinitely but is characterized as having a distinct start and stop time. The motor activation cycle corresponds directly to the pump actuation cycle, which dispenses a dosed quantity of product from dispensing system 10. After product has been dispensed, the controller 170 deactivates the motor 48 until it is re-activated again by the user in a subsequent dispense event.

The intermediate energy storage device 220 may comprise an electrostatic storage device, one example being a capacitor 224. The capacitor 224 may be constructed with a standard dielectric core or alternatively may include an electrochemical core, one example of which may comprise a supercapacitor 225. Accordingly, the intermediate energy storage device 220 is capable of holding a charge for significant lengths of time between dispense events.

Charging or recharging of the intermediate energy storage device 220 may be regulated by the controller 170. The controller 170 may include a charging circuit 177 for connecting the sources of energy 200, 230 to the energy storage device 220. In one embodiment, the controller 170 also includes a sensing circuit, or a monitoring circuit 179, for measuring the amount of energy remaining in the supercapacitor 225, i.e. intermediate energy storage device 220. Upon detecting a reduction in the energy level of the supercapacitor 225, the controller 170 (which may utilize the logic processor 173) may connect one or both of the batteries 202, 234, i.e. energy storage devices 200, 230 to the supercapacitor 225 until the supercapacitor 225 has been recharged (reference $e_1$ in FIGS. 5-8). The controller 170 functions to selectively connect one or both of the batteries 202, 234 to recharge the supercapacitor 225 based in part on dispenser usage data processed by the controller 170 (to be discussed in detail below). As indicated above, firmware and/or software may be used in the process.

In a preferred embodiment, energy stored in the supercapacitor 225 or intermediate energy storage device 220 is replenished primarily from the battery 234 or second energy supply device 230. Accordingly, energy provided by the first energy supply device 200 (i.e. the batteries in the dispenser housing) is relied on primarily as a backup for use in situations where rapid dispensing activity occurs. Once energy in the supercapacitor 225 has dropped below an upper threshold level of energy $e_1$ (i.e. a predetermined level of energy), as occurs when the supercapacitor 225 has been engaged to provide power to the motor 48, the controller 170 initiates the discharge of energy from the battery 234 to recharge the supercapacitor 225. However, in the event that the supercapacitor 225 has not had sufficient time to recharge, i.e. has not had sufficient time to recharge within a predetermined time interval, the controller 170 may draw power from the first energy supply device 200 to recharge the supercapacitor 225 so that operation of the dispensing system 10 is not hindered or interrupted.

The controller 170 may draw energy from battery 234 at different discharge rates based on how much energy is remaining in the supercapacitor 225. In general, the controller 170 is programmed or hard wired to minimize the rate at which energy is drawn from the battery 234. For instance, when a dispense event occurs, the controller 170 will draw energy from the battery 234 at a first minimal discharge rate in accordance with maximizing the useful life of the battery 234. Additionally, the controller 170 may be programmed to increase the rate at which energy is drawn from the battery 234, which changes in relation to the level of charge remaining in the supercapacitor 225.

Figure 6:
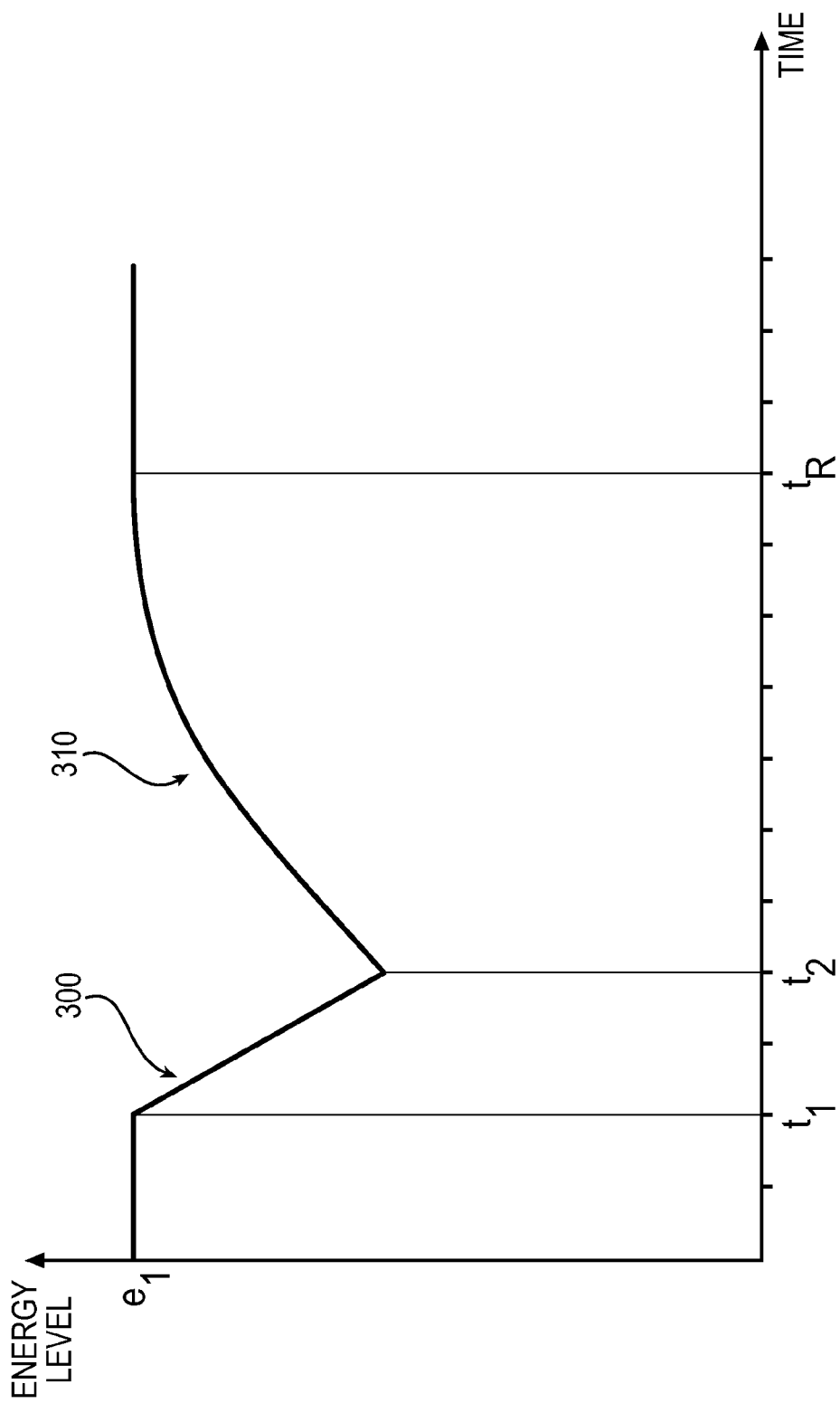
FIG. 6 is a graph depicting changes to the level of energy stored in the intermediate energy storage device over time, according to the embodiments of the subject invention.

Referencing FIGS. 5 and 6, an example will illustrate changes to the level of energy stored in the intermediate energy storage device 220. The energy storage device 220 may be initially charged to a predetermined level of energy (represented by $e_1$ in FIG. 6), which may be the maximum level of energy that the energy storage device 220 is capable of storing. When a dispense event occurs, energy from the energy storage device 220 is discharged to activate the motor 48. The span of time between $t_1$ and $t_2$ represents the finite activation cycle of the low-voltage motor 48, as discussed above. To recharge the energy storage device 220 (reference $t_2$ in FIG. 6), the controller 170 may engage the charging circuit 177 to draw power from the energy supply device 230 at a first charging rate 310. The rate of recharging 310 may change exponentially whereby the level of charge in the energy storage device 220 asymptotically approaches the initial predetermined level of energy $e_1$ as shown in the figures. As such the recharge rate 310 may be referred to as a recharge profile 310. Notably, alternate embodiments are contemplated where the recharge rate 311 is substantially linear as referenced by the timing diagram in FIG. 7a.

It will be appreciated that whether the energy storage device 220 is recharged at a linear rate or at an exponential rate, the time interval (represented by the difference between $t_2$ and $t_R$) for recharging the energy storage device 220 should be construed as being finite. In any case, the energy storage device 220 may be considered to be recharged, i.e. fully charged, when the energy level is greater than approximately 95% of the upper threshold energy level, mentioned above.

According to one embodiment, the motor 48 must complete its activation cycle before it can be re-activated. Once the motor activation cycle has been completed, the controller 170 will initiate charging of the intermediate energy storage device 220, e.g. supercapacitor 225, by discharging energy from the second energy supply device 230.

Figure 7:
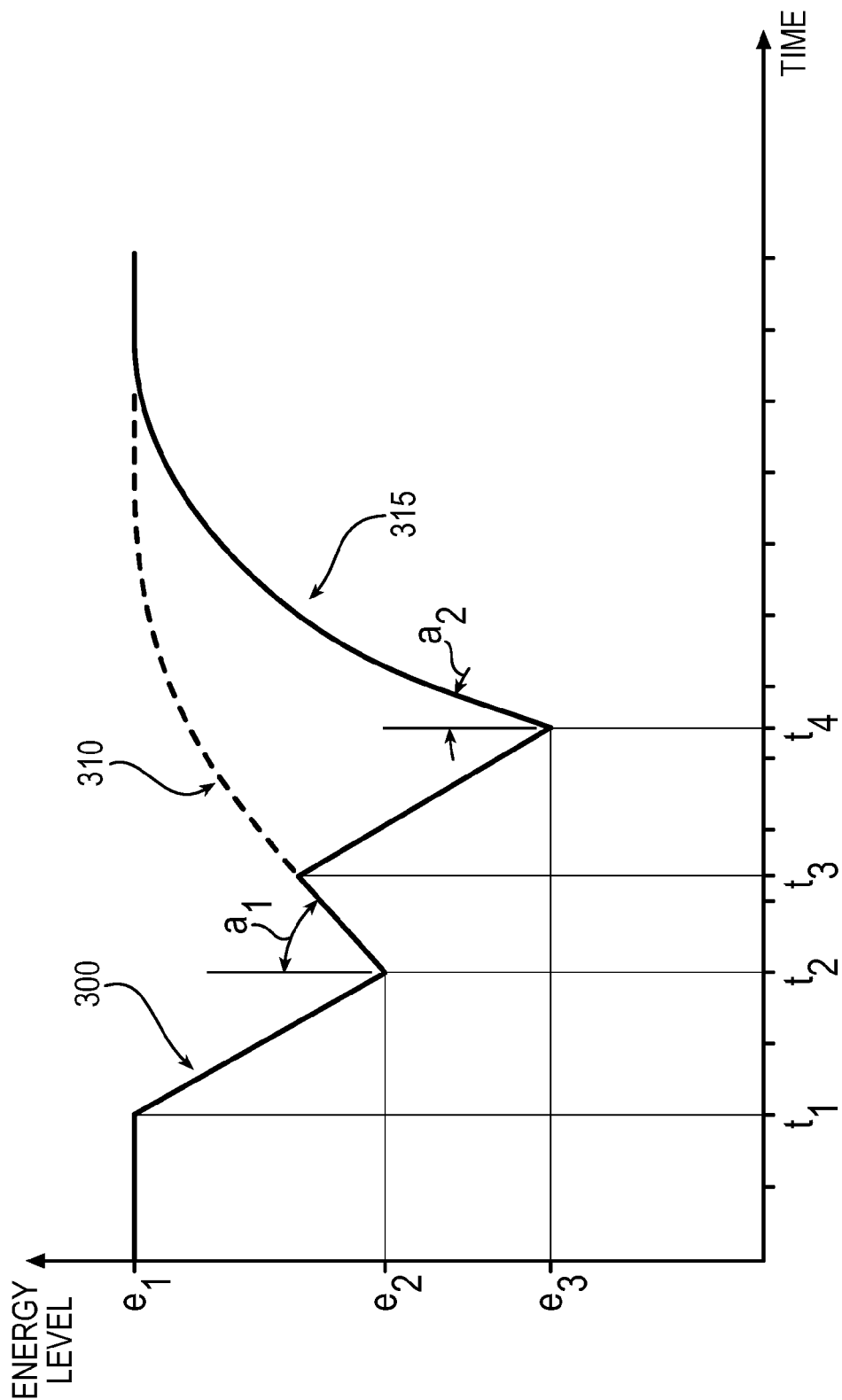
FIG. 7 is a graph depicting changes to the level of energy stored in the intermediate energy storage device over time, according to the embodiments of the subject invention.

Referencing FIGS. 5 through 7, if the dispensing system is re-activated (referenced by $t_3$ in FIG. 7) before the intermediate storage device 220 has been recharged or restored to the predetermined level of energy $e_1$, the controller 170 will change the rate at which energy is drawn from the second energy supply device 230 to increase the recharge rate 315, or recharge profile 315, of the intermediate energy storage device 220. Skilled artisans will readily see that the initial slope $a_2$ of recharge rate 315 is steeper than the initial slope $a_1$ of recharge rate 310, which represents the increase in the recharge rate and an increased drain on the batteries 234. Given an initial or first recharge rate, e.g. recharge rate 310, skilled artisans will readily see that a first time interval may be derived within which the energy storage device 220 will be recharged. From the aforementioned discussion, it follows that if the motor 48 is re-activated within the first time interval, the controller 170 will increase the first discharge rate of energy from the energy storage device to a second greater discharge rate.

Still referencing FIG. 7, in one embodiment, intermediate energy level reference values (represented generally by $e_2$ and $e_3$) for the energy storage device 220 may be predefined and the values stored in the controller 170 for comparison with measured levels of energy remaining in the energy storage device 220. Accordingly, the recharge rate 315 or recharge profile 315 may then change only when the measured level of energy in the energy storage device 220 has dropped below each of the respective intermediate energy level reference values. FIG. 7 depicts the intermediate energy level value $e_2$ coinciding with the end of the motor activation cycle 300, which relates directly to the amount of energy needed to operate the motor 48 for a single activation cycle. However, the intermediate energy level reference values $e_2$ may be defined as greater than or less than the amount of energy needed to operate the motor 48 over a single activation cycle. Any intermediate energy level values may be defined as is appropriate for use with the embodiments of the subject invention. Notably, the difference in energy level values between each of the respective intermediate threshold levels may not necessarily be equal in magnitude but may vary. For example, the difference between $e_1$ and $e_2$ may be greater than or less than the difference between $e_2$ and $e_3$.

Referencing FIG. 8, another embodiment of the subject invention will now be discussed. A lower threshold energy level value $e_n$ may be defined whereby the level of energy remaining in the energy storage device 220 is deemed to be critically low. This may occur when the dispenser 10 has been repeatedly activated within a relatively short time period. In this situation, the second energy supply device 230, which may be a coin cell battery 234, may not be capable of recharging the energy supply device 220 at the current dispenser activity level. To obviate the situation, the controller 170 may be programmed to detect when the level of energy in the energy storage device 220 has dropped below the lower threshold energy level $e_n$. In this instance, the controller 170 may direct energy to recharge the energy storage device 230 from the first energy supply device 200, which may be batteries stored in the dispenser housing. One particular embodiment is contemplated where the first energy supply device 200 supplements the second energy supply device 230 to recharge the energy storage device 220. However, another embodiment is contemplated wherein the first energy supply device 200 is connected to recharge the energy storage device 220 instead of the second energy supply device 230. In other words, in this embodiment the second energy supply device 230 is deactivated from recharging the energy storage device 220.

Figure 9:
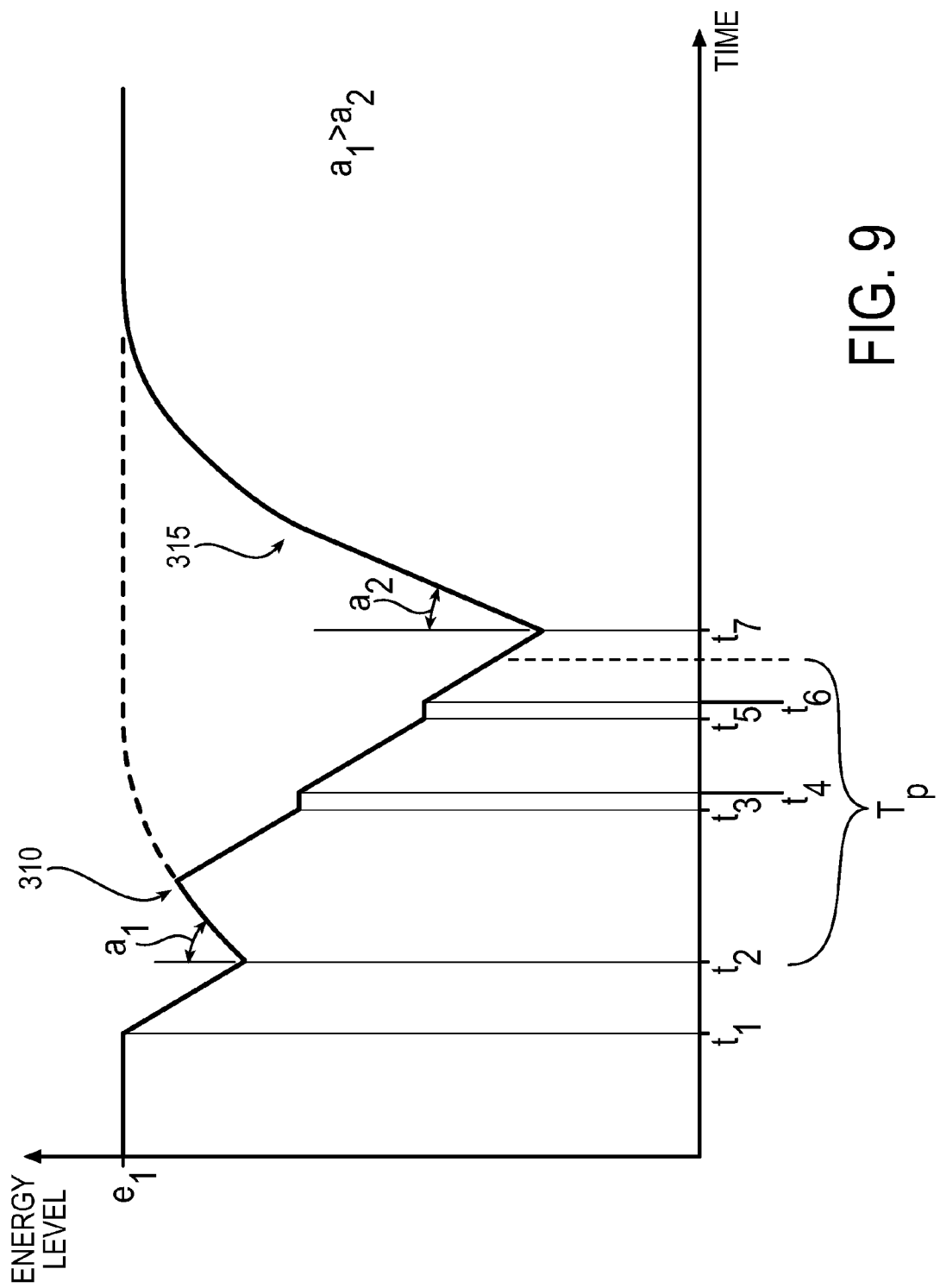
FIG. 9 is a graph depicting changes to the level of energy stored in the intermediate energy storage device over time, according to the embodiments of the subject invention.
Figure 10:
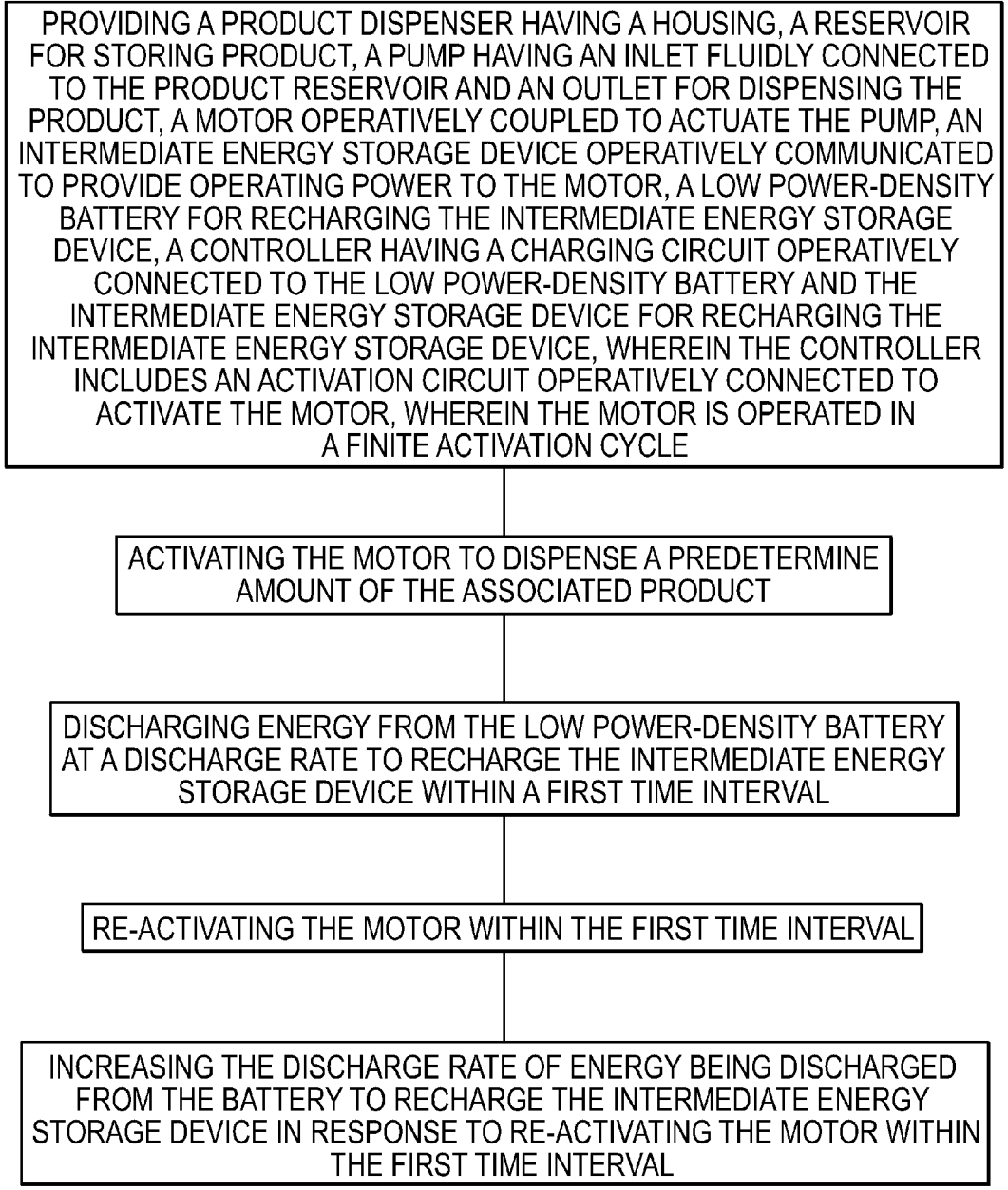
FIG. 10 is flow diagram of one method of the subject invention, according to the embodiments of the subject invention.

With reference to FIG. 9, in one embodiment, the controller 170 may not increase the first recharge rate 310 until the motor 48 has been rapidly activated. Stated differently, the controller 170 will increase the rate of drawing energy from energy supply device 230 only after several dispense events have occurred within a predetermined time interval $T_p$. For example, when the dispensing system 10 is initially activated, the controller 170 will recharge the energy storage device 220 at the first recharge rate 310, starting at $t_2$ after activation of the motor 48. The controller 170 may concurrently activate a timer. If the motor 48 is activated more than two times before the timer $T_p$ has expired, the controller 170 will then increase the recharge rate to replenish energy in the energy storage device 220 more rapidly. In other words, when the controller 170 detects a rapid decrease in the energy level of the storage device 220, the controller 170 will increase the rate of energy discharged from the second energy supply device 230 to recharge the energy storage device 220. Notably, the number of dispensing events (i.e. motor activation cycles) that must occur in a predetermined timeframe before the controller adjusts the rate of drawing energy from supply device 230 may vary as is appropriate for use with a particular dispensing system.

In another embodiment of the subject invention, the change in the discharge rate of the energy supply device 230 may follow a profile related, not only to the speed at which dispensing events occur, but also to the quantity of fluid product remaining in the product reservoir 26. In this embodiment, the controller 170 may employ a counting circuit, which increments with every actuation of the dispensing system 10 and more specifically with every activation of the motor. The aforementioned represents one embodiment in which dispenser usage data is collected by the controller 170. From the counter, the controller 170 can estimate how much product is remaining in the product reservoir 26. Accordingly, the controller 170 can adjust the discharge rate of supply device 230 based on the amount of product remaining in the product reservoir 26. For larger volumes of product remaining in the product reservoir 26, the controller 170 may follow a discharge rate profile that more conservatively draws energy from supply device 230, similar to that of the embodiment previously described. However, for situations where the amount of product remaining in the supply device 200 is relatively small, e.g. when the container is approaching empty, the controller 170 may draw energy more aggressively from supply device 230. In other words, the rate at which energy from the energy supply device 230 is drawn to recharge energy storage device 220 may be set by the controller 170 at a first lower discharge rate for larger volumes of product remaining in the product reservoir 26 and at a second higher discharge rate for smaller volumes of product remaining in the product reservoir 26.

In one particular embodiment, the controller 170 may be programmed to adjust the rate of discharge for storage device 220 based on four discrete levels of fluid product remaining in the product reservoir 26. The four discrete levels may occur evenly at the quarter-fill levels of the product reservoir 26, i.e. 25%, 50%, 75%, 100%. However it is contemplated that the discrete levels may not be equal in magnitude. Rather, the levels may be weighted unevenly based in part on the size, i.e. storage capacity, of the storage device 220. For example, the first discrete level may be set when 50% of the product is remaining in the product reservoir 36. The second discrete level may accordingly be set at 25%. The last two levels may respectively be set at 12% and 6% respectively. Persons of skill in the art will readily understand that other nonlinear profiles may be incorporated as is useful for a particular type of product reservoir 26.

Referencing FIG. 3 once again, the product reservoir 26 may include a memory storage device, shown generally at 210. The memory storage device 210 may comprise non-volatile memory 212, examples of which include: read-only memory, flash memory, and/or optical or magnetic memory storage. In particular, the memory storage device 210 comprises memory that can be rewritten after installation into the dispenser. It follows that the memory storage device 210 may be electrically communicated to the controller 170 whereby information can be read from and/or downloaded to the memory device 210. Memory, i.e. the memory storage device 210, may be used to store information used by the controller and/or logic processor for operating the product dispenser 10. Such information may comprise data representing an algorithm that may be executed by the logic processor. Memory may also be used to store data associated with sensor feedback. Additionally, memory may be used to store information, either permanently or temporarily, related to dispenser usage data. Still, any manner of utilizing the memory storage device 210 may be chosen as is appropriate for use with the embodiment of the subject invention. Skilled artisans will appreciate that electrical communication between memory device 210 and controller 170 may include wireless communication as well as direct electrical connections.

In one preferred embodiment, the memory storage device 210 comprises flash memory 212a that stores information related to the amount product initially stored into the product reservoir 26. More specifically, flash memory 212a stores data identifying the initial amount of product stored in the product reservoir 26 and may store data related to the amount product remaining in the product reservoir 26 after every dispensing event. Notably, other types of information may be stored in the memory device 210. Such information may include but is not limited to: the date the product reservoir was installed, product expiration information, the type of product stored in the product reservoir (i.e. keying or tagging information), as well as other information deemed appropriate to persons of ordinary skill in the art. Accordingly, the discharge profile used to draw energy from the first and second energy supply devices 200, 230, as well as the intermediate energy storage device 220, may be governed by the controller 170 in response to the data stored in memory device 210.

Another embodiment of the subject invention is considered where the batteries 233 are intentionally drained of energy when the volume of product remaining in the product reservoir 26 is close to zero or when the volume crosses a minimum threshold of remaining product. When the threshold is reached, the controller 170 may connect the batteries 233 to one or more energy draining circuits 215 (reference FIG. 4), which may comprise a resistor or other short circuit device that substantially drains or depletes the energy in the batteries 233. Notably, the controller 170 may check the level of energy stored in the intermediate energy storage device 220 prior to draining the batteries 233. In this way, the intermediate energy storage device 220 may be recharged if needed thus maximizing the usefulness of the batteries 233 before disposal thereof. In any case, information from memory stored onboard the product reservoir 26, namely memory device 210, may be used to determine the appropriate time to engage the energy draining circuits 215.

It is noted here that while some of the embodiments described herein discuss the specific application of providing power to operate a motor, similar applications may be made to other components of the dispensing system 10. For example, another embodiment is presently described where in a manner similar to that described above, the controller 170 may provide power to operate a display unit 300 received by the housing 14. The display unit 300 may comprise an LCD display 301 or other type displaying device that communicates with the user either visually or audibly. Information such as battery status or remaining reservoir refill level may be depicted on the display 300. Additionally, advertisements may be depicted on the display 300. Still other information may be displayed, which pertains to network connectivity or even dispenser usage in the instance where dispenser data is used to monitor hygiene compliance. Other examples of dispensing system components may include solenoids, wireless transceivers, indicator lights, and the like. Such device(s) may be activated periodically and similarly may have a finite activation cycle. Accordingly, power to operate these types of devices may be supplied from the intermediate energy storage device 220. It follows that recharging of the intermediate energy storage device 220 will be accomplished in a similar manner to that of the motor 48 described above. In this manner, application of the principles described herein may be applied to any of the dispensing system components.

Having illustrated and described the principles of the dispensing system in one or more embodiments, it should be readily apparent to those skilled in the art that the invention can be modified in arrangement and detail without departing from such principles.

It is claimed:

1. A product dispenser, comprising:
   a dispenser housing;
   a readily replaceable product reservoir for storing an associated product;
   a battery integrated into the readily replaceable product reservoir;
   a pump having an inlet fluidly connected to the readily replaceable product reservoir, the pump having an outlet for dispensing the associated product;
   an electrically powered, low-voltage motor operatively coupled to actuate the pump;
   an intermediate energy storage device operatively communicated to provide operating power to the motor, wherein the intermediate energy storage device is configured to store a predetermined level of energy that is sufficient to activate the motor through multiple activation cycles; and,
   a controller operatively communicated to selectively activate the motor, wherein the controller is operatively communicated to the battery and to the intermediate energy storage device, wherein the controller initiates discharging energy from the battery in response to the motor being activated for recharging the intermediate energy storage device to the predetermined level of energy;
   wherein the controller is operable to selectively initiate discharging energy from the battery at one of a plurality of substantially different discharge rates;
   wherein, when the motor is activated, the controller changes the discharge rate of discharging energy from the battery if the intermediate energy storage device has not been substantially recharged to the predetermined level of energy;
   wherein, in response to activating the motor, the controller initiates discharging energy from the battery at a first discharge rate to recharge the intermediate energy storage device within a first time interval; and
   wherein, in response to activating the motor again within the first time interval, the controller increases the first discharge rate to a greater second discharge rate.

2. The product dispenser as defined in claim 1, wherein the intermediate energy storage device is a supercapacitor.

3. The product dispenser as defined in claim 1, wherein the battery is a coin cell battery.

4. The product dispenser as defined in claim 1, further comprising:
   an energy source operatively mounted to the dispenser housing that is operatively communicated to the intermediate energy storage device; and,
   wherein the controller is operable to selectively initiate discharging energy from one or both of the battery integrated into the readily replaceable product reservoir and the energy source operatively mounted to the dispenser housing for recharging the intermediate energy storage device.

5. The product dispenser as defined in claim 4, wherein when the energy level in the intermediate energy storage device falls below a lower threshold energy level, the controller initiates discharging energy from the energy source operatively mounted to the dispenser housing to recharge the intermediate energy storage device.

6. The product dispenser as defined in claim 5, wherein when the energy level in the intermediate energy storage device falls below the lower threshold energy level, the controller deactivates the flow of energy from the battery integrated into the readily replaceable product reservoir.

7. The product dispenser as defined in claim 5, wherein when the energy level in the intermediate energy storage device falls below the lower threshold energy level, the controller initiates the flow of energy from the battery integrated into the readily replaceable product reservoir and from the energy source operatively mounted to the dispenser housing to recharge the intermediate energy storage device.

8. A dispenser comprising:
   a housing;
   an actuator for causing a product to be dispensed;
   a refill unit configured to be removably inserted into the housing;
   the refill unit having a refill power source;
   a microcontroller;
   memory;
   timing circuitry;
   charging circuitry;
   a dispenser power source;
   an intermediate power storage device; and circuitry for controlling a charging rate of the intermediate power storage device;
wherein the circuitry for controlling the charging rate of the intermediate power storage device charges the intermediate power storage device at a rate that is a function of the timing between a first dispense actuation and a second dispense actuation; and
wherein, if the second dispense actuation occurs prior to the intermediate power storage device being charged above a predetermined threshold, the charge rate after the second dispense actuation is greater than the charge rate after the first dispense actuation.

9. The dispenser of claim 8 wherein if the second dispense actuation occurs prior to the intermediate power storage device being fully charged, the charge rate after the second dispense actuation is greater than the charge rate after the first dispense actuation.

10. The dispenser of claim 8 wherein the intermediate power storage device is charged from the refill power source.

11. The dispenser of claim 8 wherein the intermediate power storage device is charged from the dispenser power source.

12. The dispenser of claim 8 wherein the intermediate power storage device is a capacitor.

13. The dispenser of claim 8 wherein refill power source is a battery.

14. A dispenser comprising:
a housing;
an actuator for causing a product to be dispensed;
a refill unit configured to be removably inserted into the housing;
the refill unit having a refill power source;
a microcontroller;
memory;
charging circuitry;
a dispenser power source;
an intermediate power storage device; and
circuitry for controlling a charging rate of the intermediate power storage device;
wherein the circuitry for controlling the charging rate of the intermediate power storage includes at least two different charge rates; and
wherein use of one of the at least two different charge rates to charge the intermediate power storage device is a function of one of timing between dispense functions, the product being dispensed, the number of dispense counts for the refill, information stored on the refill, charge on the intermediate storage device and charge on the refill power source; and
wherein, if a second dispense actuation occurs prior to the intermediate power storage device being charged above a predetermined threshold, the charge rate after the second dispense actuation is greater than the charge rate after a first dispense actuation.

15. The dispenser of claim 14 wherein if a second dispense actuation occurs prior to the intermediate power storage device being fully charged, the charge rate after the second dispense actuation is greater than the charge rate after a first dispense actuation.

16. The dispenser of claim 14 wherein the intermediate power storage device is charged from the refill power source.

17. The dispenser of claim 14 wherein the intermediate power storage device is charged from the dispenser power source.

18. The dispenser of claim 14 wherein the intermediate power storage device is a capacitor.

19. The dispenser of claim 14 wherein refill power source is a battery.

20. A product dispenser, comprising:
a dispenser housing;
a readily replaceable product reservoir for storing an associated product;
a battery integrated into the readily replaceable product reservoir;
a pump having an inlet fluidly connected to the readily replaceable product reservoir, the pump having an outlet for dispensing the associated product;
an electrically powered, low-voltage motor operatively coupled to actuate the pump;
an intermediate energy storage device operatively communicated to provide operating power to the motor, wherein the intermediate energy storage device is configured to store a predetermined level of energy that is sufficient to activate the motor through multiple activation cycles;
an energy source operatively mounted to the dispenser housing that is operatively communicated to the intermediate energy storage device; and
a controller operatively communicated to selectively activate the motor, wherein the controller is operatively communicated to the battery and to the intermediate energy storage device, wherein the controller initiates discharging energy from the battery in response to the motor being activated for recharging the intermediate energy storage device to the predetermined level of energy;
wherein the controller is operable to selectively initiate discharging energy from one or both of the battery integrated into the readily replaceable product reservoir and the energy source operatively mounted to the dispenser housing for recharging the intermediate energy storage device;
wherein the controller is operable to selectively initiate discharging energy from the battery at one of a plurality of substantially different discharge rates;
wherein, when the motor is activated, the controller changes the discharge rate of discharging energy from the battery if the intermediate energy storage device has not been substantially recharged to the predetermined level of energy;
wherein, when the energy level in the intermediate energy storage device falls below a lower threshold energy level, the controller initiates discharging energy from the energy source operatively mounted to the dispenser housing to recharge the intermediate energy storage device.

21. The product dispenser as defined in claim 20, wherein when the energy level in the intermediate energy storage device falls below the lower threshold energy level, the controller deactivates the flow of energy from the battery integrated into the readily replaceable product reservoir.

22. The product dispenser as defined in claim 20, wherein when the energy level in the intermediate energy storage device falls below the lower threshold energy level, the controller initiates the flow of energy from the battery integrated into the readily replaceable product reservoir and from the energy source operatively mounted to the dispenser housing to recharge the intermediate energy storage device.

* * * * *